S. A. BROOKS.
COOKING UTENSIL.
APPLICATION FILED APR. 19, 1912.
1,053,780. Patented Feb. 18, 1913.
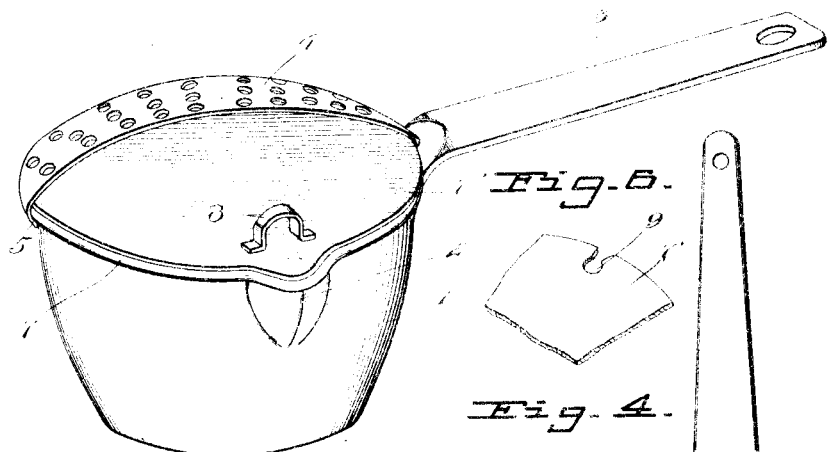
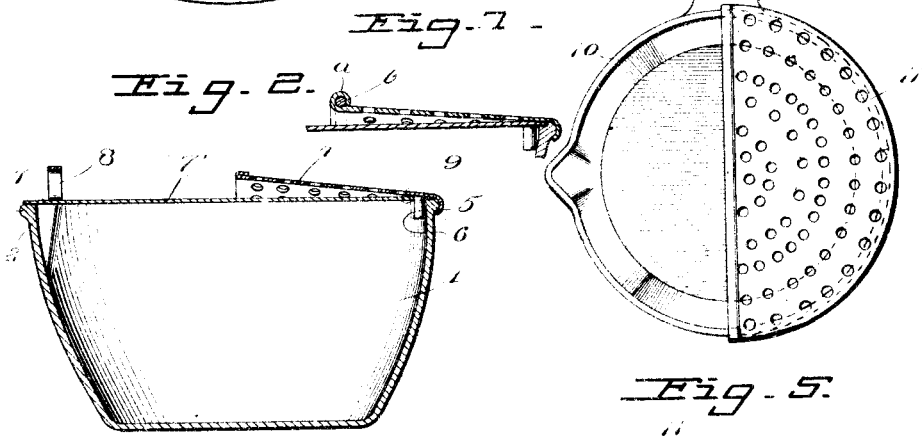
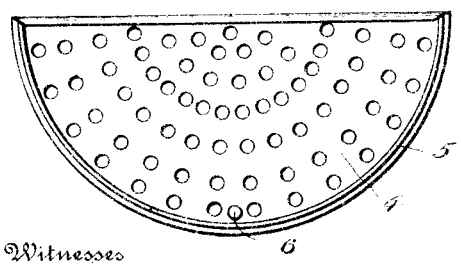
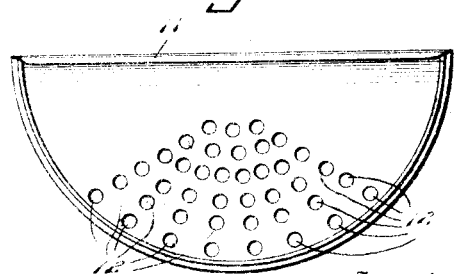
Inventor
Samuel A. Brooks
Witnesses
By Victor J. Evans
Attorney

UNITED STATES PATENT OFFICE.

SAMUEL ABRAHAM BROOKS, OF ELMWOOD PLACE, OHIO, ASSIGNOR, BY DIRECT AND MESNE ASSIGNMENTS, TO THE WOMAN'S FRIEND MANUFACTURING COMPANY, OF ELMWOOD PLACE, OHIO, A CORPORATION OF OHIO.

COOKING UTENSIL.

1,053,780.   Specification of Letters Patent.   Patented Feb. 18, 1913.

Application filed April 19, 1912. Serial No. 691,790.

*To all whom it may concern:*

Be it known that I, SAMUEL A. BROOKS, a citizen of the United States, residing at Elmwood Place, in the county of Hamilton and State of Ohio, have invented new and useful Improvements in Cooking Utensils, of which the following is a specification.

The present invention relates to cooking utensils.

In carrying out my invention it is my purpose to provide a cooking utensil having a colander or strainer attached to the open mouth thereof, and whereby water may be poured from the utensil without allowing the escape of the vegetables being cooked within the utensil.

With the above recited object in view and others of a similar nature which will be more fully understood as the description of the invention progresses, the improvement resides in the novel construction, combination and arrangement of parts set forth in the description and falling within the scope of the appended claim.

In the drawing, Figure 1 is a perspective view of a utensil having my improvement. Fig. 2 is a transverse sectional view through the same. Fig. 3 is a bottom plan view of the strainer detached. Fig. 4 is a top plan view of a modified form. Fig. 5 illustrates a still further modified form. Fig. 6 is a detail view of the portion of the top provided with a slot or opening for engaging with the stud of the strainer. Fig. 7 is a detail sectional view illustrating the mouth of the strainer provided with a bead having a reinforcing wire.

Referring now to the drawings in detail the numeral 1 designates an ordinary cooking utensil, the same being provided with the usual outlet lip or spout 2 and with the handle 3.

The numeral 4 designates the improved strainer, which in the showing illustrated in Figs. 1, 2 and 3 of the drawing is approximately semi-circular in plan and which is arched in front elevation. The lower edge of the strainer 4 is provided with a downturned resilient flange 5, the said flange adapted to resiliently engage with the bead 7 provided upon the mouth of the utensil 1.

Arranged centrally of the strainer 4 and adjacent the downturned flange 5 is a pin 6, the same being sufficiently spaced away from the said flange to frictionally engage with the inner wall of the utensil.

By an arrangement as just described it will be noted that the foraminated strainer member 4 may be easily and quickly attached to the utensil, and while removable therefrom may, if desired, remain a permanent fixture, the flange exerting a tension or pressure upon the bead and toward the pin preventing the accidental displacement of the said strainer.

The numeral 7 designates a top for the utensil. This top is preferably formed of a flattened sheet of metal corresponding to the contour of the mouth of the utensil and to the outlet spout thereof. The cover is preferably provided with a handle 8 and is further provided with a slot or opening 9, the latter adapted to engage with the pin of the strainer when the lid or cover is passed below the arched strainer and upon the mouth of the utensil.

In Fig. 4 of the drawing the cooking utensil is illustrated in the form of a frying pan and is designated by the numeral 10. The numeral 11 designates the strainer which is of a shape substantially similar to that described, but which in this instance is permanently attached to the pan through the medium of rivets or other securing element.

In Fig. 5 of the drawing the strainer may be constructed as a permanent element for the cooking utensil 10. The shape of the strainer is substantially similar to that set forth, but the top of the strainer adjacent its point of connection with the utensil is formed with only a limited number of openings 12, the same being arranged upon the strainer centrally thereof, and adjacent its point of connection with the edge of the utensil.

In Fig. 7 I have illustrated the strainer as having its mouth or curved edge formed with a bead $a$, and positioned within the said bead is a wire *b*, the same adapted to reinforce and strengthen the strainer.

Having thus described the invention, what I claim is:—

A cooking utensil provided with a foraminated member, said member being semi-circular in plan, the circular edge of the said member being rounded to provide a resilient flange, and the said member being further provided with a depending pin which is arranged adjacent the flange.

In testimony whereof I affix my signature in presence of two witnesses.

SAMUEL ABRAHAM BROOKS.

Witnesses:
 JESSE HANNAH,
 BERNARD J. ROGERS.